(12) United States Patent
Hirota et al.

(10) Patent No.: US 8,107,259 B2
(45) Date of Patent: Jan. 31, 2012

(54) PORTABLE ELECTRONIC DEVICE

(75) Inventors: Hiroyuki Hirota, Kanagawa (JP); Kangmin Choe, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 234 days.

(21) Appl. No.: 12/601,132

(22) PCT Filed: May 23, 2008

(86) PCT No.: PCT/JP2008/059554
§ 371 (c)(1),
(2), (4) Date: Nov. 20, 2009

(87) PCT Pub. No.: WO2008/143348
PCT Pub. Date: Nov. 27, 2008

(65) Prior Publication Data
US 2010/0157553 A1    Jun. 24, 2010

(30) Foreign Application Priority Data
May 23, 2007  (JP) .................................. 2007-136837

(51) Int. Cl.
*H04B 1/03* (2006.01)
(52) U.S. Cl. .......................... 361/814; 361/752; 361/755
(58) Field of Classification Search .................. 361/730, 361/752, 755, 814; 455/550.1, 575.1, 575.3, 455/575.4; 379/433.01
See application file for complete search history.

(56) References Cited

U.S. PATENT DOCUMENTS

| | | | | |
|---|---|---|---|---|
| 7,369,883 B2 * | 5/2008 | Kori et al. | .................. | 455/575.3 |
| 7,443,351 B2 * | 10/2008 | Komine | ......................... | 343/702 |
| 7,460,888 B2 * | 12/2008 | Oyama | ......................... | 455/566 |
| 7,567,823 B2 * | 7/2009 | Makino et al. | ................ | 455/566 |
| 7,684,836 B2 * | 3/2010 | Taneda et al. | .............. | 455/575.3 |
| 7,684,837 B2 * | 3/2010 | Ito | ............................... | 455/575.3 |

FOREIGN PATENT DOCUMENTS

| | | |
|---|---|---|
| JP | 2005-192012 | 7/2005 |
| JP | 2005-210419 | 8/2005 |
| JP | 2006-53532 | 2/2006 |

* cited by examiner

*Primary Examiner* — Dameon Levi
(74) *Attorney, Agent, or Firm* — Procopio, Cory, Hargreaves & Savitch LLP

(57) ABSTRACT

Provided is a portable electronic device wherein breakage due to stress concentration at a portion of a housing in a connecting part side is suppressed. A second housing 5 of a mobile phone 1 has a front case 29 and a rear case 37 which face each other in a direction that faces a first housing 3 in a closed state. The front case 29 and the rear case 37 are connected to each other at a plurality of hole parts 41 arranged at a plurality of positions within a facing surface. The front case 29 has a resin part 55 formed of a resin, and a sheet metal part 57 which is formed of a metal and is at least partially embedded in the resin part 55. The sheet metal part 57 has a main body part 59 surrounded by the hole parts 41; and an extending part 61 extending from the main body part 59 up to a position closer to the connecting part 7 than a hole part 41A, 41B arranged closer to the connecting part 7 than the main body part 59 and embedded in the resin part 55.

8 Claims, 9 Drawing Sheets

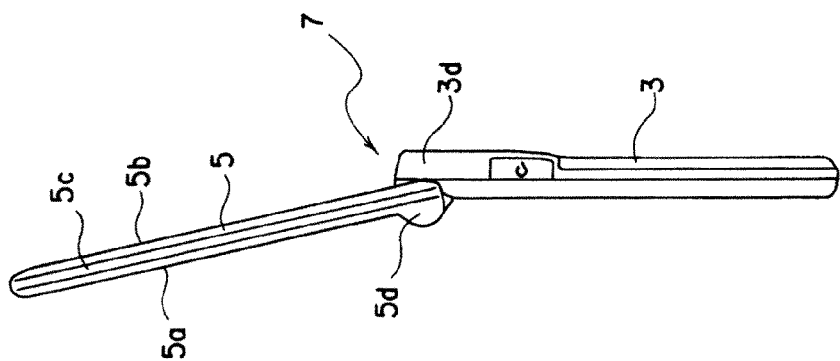
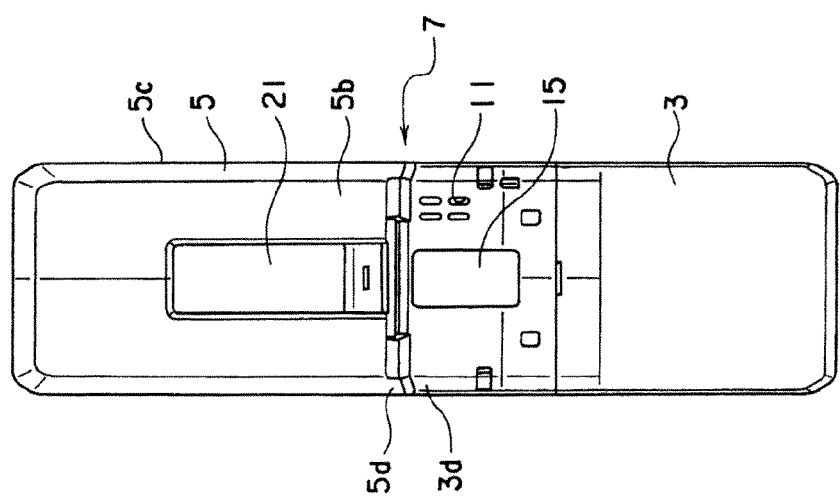
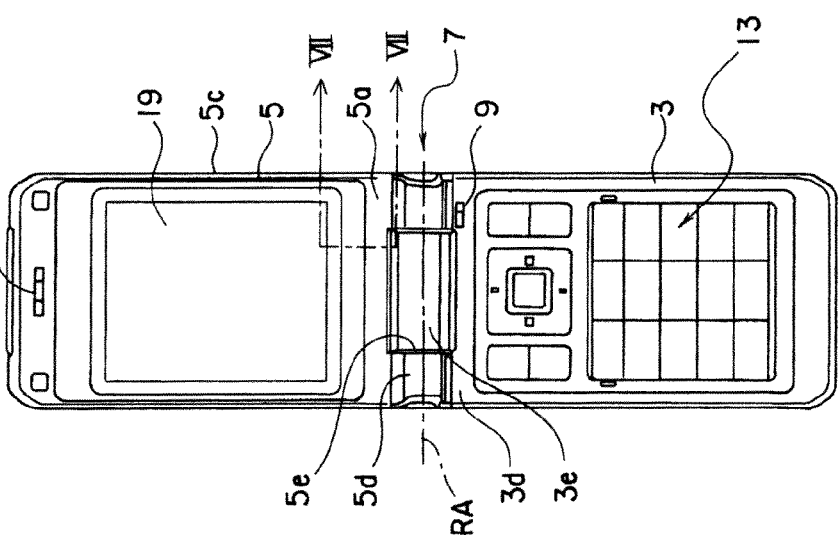

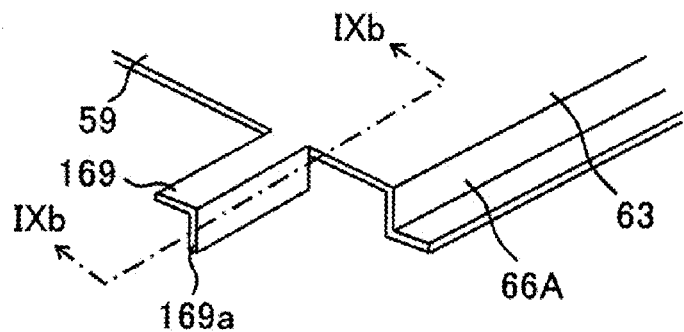
FIG. 9A
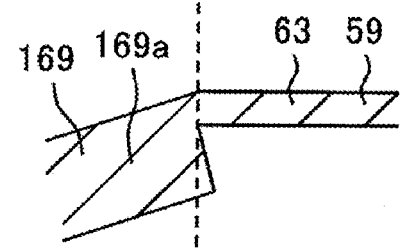
FIG. 9B
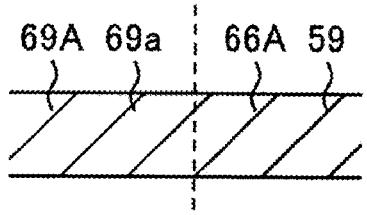
FIG. 9C
FIG. 9D

PORTABLE ELECTRONIC DEVICE

TECHNICAL FIELD

The present invention relates to a mobile phone, digital camera, PDA, laptop computer, game machine, and other portable electronic devices.

BACKGROUND ART

A portable terminal and other portable electronic devices having two housings which are connected to be able to open and close are known (for example, Patent Literature 1). Each housing is comprised of two case members connected by screws while sandwiching electronic parts. A plurality of screws are provided near the four corners of the housing or at other appropriate positions. In Patent Literature 1, in order to improve the housing strength, a sheet metal member is arranged at the back surface of a display module. Further, in order to achieve both increased thinness and secured strength, a mobile phone having housings formed by so-called insert molding is known. The housings of this mobile phone are comprised of resin members in which sheet metal members are embedded.

Patent Literature 1: Japanese Patent Publication (A) No. 2005-192012

DISCLOSURE OF INVENTION

Problem to be Solved by the Invention

The connecting part side of housings connected to be able to open and close easily is subjected to excessive load. For example, when a user puts the open mobile phone against his or her ear, a load is applied causing the housings to open further in the opening direction from the open state. On the other hand, where housings are formed by insert molding, stress concentrates at end portions of the insert members. Accordingly, the housings were liable to break at the end portions of the insert members.

Accordingly, provision of a portable electronic device able to suppress breakage of the housings due to occurrence of stress concentration is desired.

Means for Solving the Problem

A portable electronic device of the present invention has a first housing, a second housing, and a connecting part connecting the first housing and the second housing to be able to open and close, wherein the second housing has a first case member and a second case member which are arranged to face each other in a direction in which the second housing faces the first housing in a closed state, the first case member has a plurality of connected portions which are arranged at a plurality of positions facing the second case member and connected with the second case member, a first component part formed by a first material, and a second component part formed by a second material having a higher modulus of elasticity than the first material and at least partially embedded in the first component part, and the second component part has a main body part surrounded by the plurality of connected portions, and an extension part extending from the main body part up to a position closer to the connecting part than a connected portion arranged closer to the connecting part than the main body part among the plurality of connected portions and embedded in the first component part.

Preferably, the extension part has a reinforcing part arranged along a direction in which the first case member and the second case member face each other.

Preferably, the main body part has a holding recess part formed to be able to hold an electronic part, the holding recess part has a wall part arranged along the direction in which the first case member and the second case member face each other, and the reinforcing part is formed continuous from the wall part.

Preferably, the connected portion located closer to the connecting part than the main body part is arranged at the outer periphery side of the first case member in a direction perpendicular to a direction from the main body part to the connecting part, and the reinforcing part is arranged at the side of the outer periphery of the first case member relative to the connected portion located closer to the connecting part than the main body part in the perpendicular direction.

Preferably, the first material is a resin, and the second material is a metal.

Preferably, the first component part is formed with an opening part exposing the extension part.

Preferably, the device has a circuit board provided in the second housing and a conductive member which abuts against a portion of the extension part exposed from the opening part to connect the extension part and a ground line of the circuit board.

Preferably, the connecting part has hinge parts inserted through the first housing and the second housing, and the hinge parts are arranged up to a position closer to the main body part than the front end of the extension part on the connecting part side.

Effects of the Invention

The present invention enables breakage of a housing due to occurrence of stress concentration to be suppressed.

BRIEF DESCRIPTION OF DRAWINGS

[FIG. 1] Views showing an outer appearance of a mobile phone of an embodiment of the present invention.

[FIG. 9] A diagram explaining effects of the mobile phone of FIG. 1.

EXPLANATION OF REFERENCES

Figure 2:
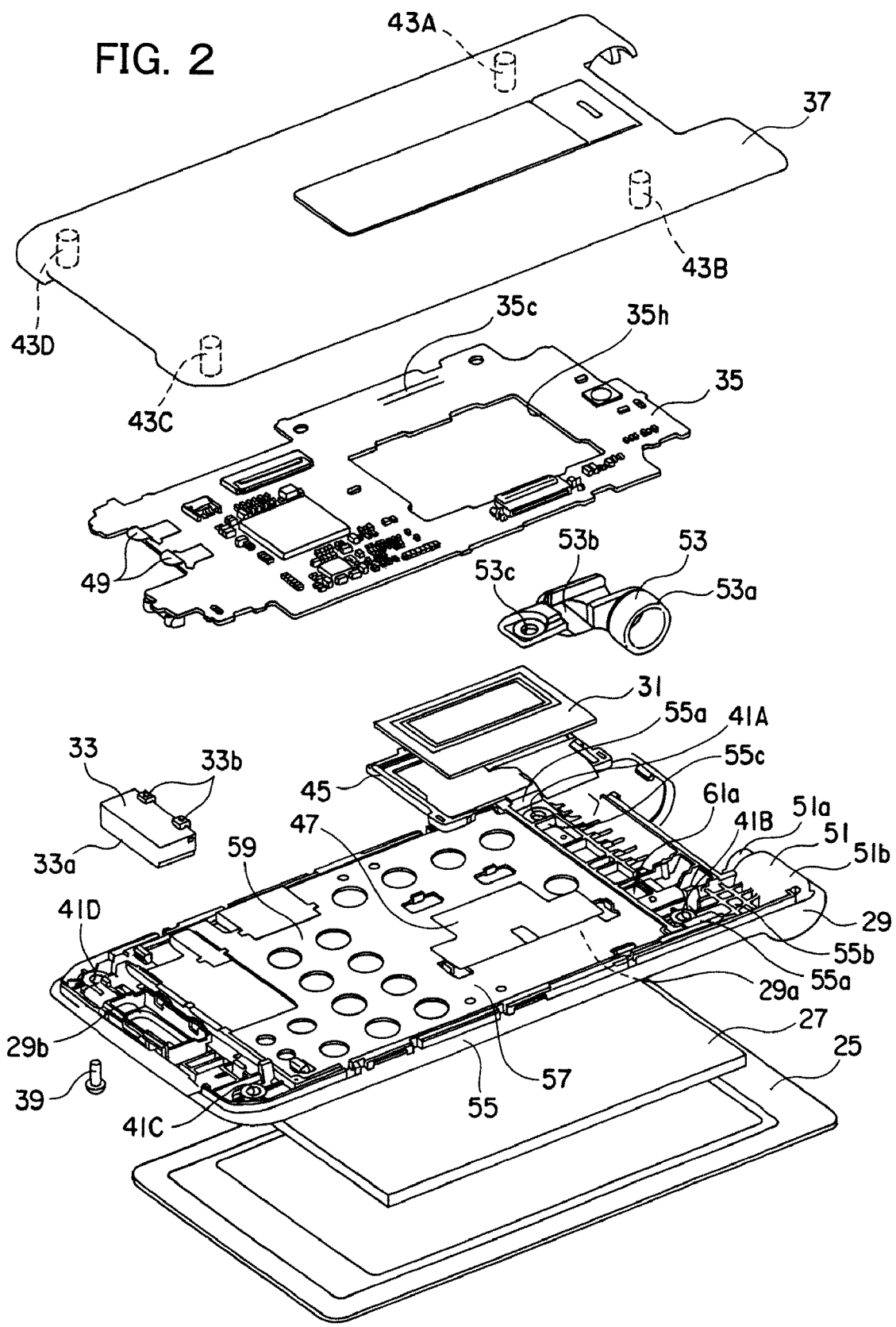
[FIG. 2] A disassembled perspective view of a second housing of the mobile phone of FIG. 1.

1 ... mobile phone (portable electronic device), 3 ... first housing, 5 ... second housing, 7 ... connecting part, 29 ... front case (first case member), 37 ... rear case (second case member), 41 ... hole parts (connected portions), 55 ... resin part (first component part), 57 ... sheet metal part (second component part), 59 ... main body part, and 61 ... extension part.

BEST MODE FOR CARRYING OUT THE INVENTION

FIG. 1 are views showing an outer appearance of a mobile phone 1 as a portable electronic device according to an embodiment of the present invention, in which FIG. 1(a) is a front view, FIG. 1(b) is a back view, and FIG. 1(c) is a side view.

The mobile phone 1 is so-called flip-open type mobile phone and is provided with a first housing 3 and a second housing 5 connected to be able to open and close. Note that, FIG. 1 show the mobile phone 1 in an open state. Further, the first housing 3 and the second housing 5 are connected by a connecting part 7. The first housing 3 and the second housing 5 can relatively rotate around a rotation axis RA (FIG. 1(a)).

The first housing 3 and second housing 5 constitute a whole of housing of the mobile phone 1. The first housing 3 and second housing 5 are formed to, for example, schematically the same shape. They are superimposed on each other in a closed state and substantially match in contours. The first housing 3 and second housing 5 are formed as, for example, thin box shapes.

Below, the direction of alignment of the first housing 3 and second housing 5 in an open state shown in FIGS. 1(a) to 1(c) will be sometimes referred to as a "length direction" and a direction perpendicular to this length direction and parallel to the rotation axis RA will be sometimes referred to as a "width direction".

The first housing 3 is provided with a sound pickup hole part 9 for a speech use microphone 95, sound emitting hole parts 11 for a sound use speaker 99 for outputting ring tones etc., an operation part 13 accepting operations of a user, and a camera part 15 capturing images.

The second housing 5 is provided with, for example, a sound emitting hole part 17 for a speech use speaker 33 and a main display part 19 (FIG. 1(a)) and sub display part 21 (FIG. 1(b)) displaying images, including graphics, text, etc. The main display part 19 is arranged at a facing surface part 5a of the second housing 5 facing the first housing 3 in a closed state and displays images. The sub display part 21 is arranged at a back surface part 5b on the back side of the facing surface part 5a of the second housing 5 and displays images.

The connecting part 7 connects a first end 3d of the first housing 3 and a second end 5d of the second housing 5. Specifically, the connecting part 7 is comprised of a connecting recess part 5e formed at the second end 5d of the second housing 5 and a connecting projection 3e formed at the first end 3d of the first housing 3 and inserted in the connecting recess part 5e.

FIG. 2 is a disassembled perspective view of the second housing 5.

In the second housing 5, a panel 25, main display device 27, front case 29, sub display device 31, speech use speaker 33, circuit board 35, and rear case 37 are stacked in order in a direction from the facing surface part 5a to the back surface part 5b. Note that, some of the parts are arranged in parallel.

The second housing 5 is comprised of a front case 29 and a rear case 37. Note that, the panel 25 can also be considered a portion of the second housing 5. The front case 29 (and panel 25) constitutes the facing surface part 5a and the facing surface part 5a side part of an outer peripheral surface part 5c of the second housing 5. The rear case 37 constitutes the back surface part 5b and the back surface part 5b side of the outer peripheral surface part 5c of the second housing 5. The rear case 37 is made of for example a resin.

The front case 29 and the rear case 37 face each other in a direction (up/down direction in FIG. 2) in which the second housing 5 faces the first housing 3 in a closed state. The front case 29 and the rear case 37 are connected with each other by, for example, a plurality of screws 39 (only one is shown).

In the front case 29, a plurality of hole parts 41A to 41D (hereinafter, A to D will be sometimes omitted) are formed. The plurality of hole parts 41 are formed at a plurality of positions in the facing surfaces of the front case 29 and the rear case 37. For example, the plurality of hole parts 41A to 41D are formed at the four corners of the schematically rectangular front case 29 when seen in the facing direction.

On the other hand, in an inner surface of the rear case 37, at positions corresponding to the plurality of hole parts 41, screw bosses 43A to 43D (hereinafter, A to D will be sometimes omitted) projecting to the front case 29 side are formed. By screwing screws 39 inserted through the hole parts 41 from the facing surface part 5a side into the screw bosses 43, the front case 29 and the rear case 37 are fastened to each other.

Note that, the front case 29 and the rear case 37 are also connected with each other also by for example fitting a portion of the rear case 37 forming the outer peripheral surface part 5c over the ridge of a portion of the front case 29 forming the outer peripheral surface part 5c.

The speaker 33, circuit board 35, and other electronic parts which are arranged between the front case 29 and the rear case 37 are directly or indirectly clamped by the front case 29 and the rear case 37 by connection of the front case 29 and the rear case 37 with each other and are thereby held in the second housing 5.

The panel 25 is a sheet member formed by, for example, a resin having a light transmission property. The panel 25 has a size large enough to cover the display surface of the main display device 27. The panel 25 is fixed to the surface of the front case 29 on the side of the facing surface part 5a by, for example, a two-sided tape, binder, or other appropriate fixing member.

The main display device 27 forms the main display part 19. The main display device 27 is, for example, a liquid crystal display, organic EL display, or other display. The main display device 27 has a relatively large area, for example, has an area of at least half of the facing surface part 5a. Note that, the area of the main display device 27 is smaller than the area surrounded by the plurality of hole parts 41. The main display device 27 is fit in the holding recess part 29a of the front case 29 formed at the facing surface part 5a side.

The sub display device 31 forms the sub display part 21. The sub display device 31 is, for example, a liquid crystal display, organic EL display, or other display. The sub display device 31 is held by a frame holder 45 formed by a resilient member and is placed at the inner side surface of the front case 29 via the holder 45. The sub display device 31 is held in the second housing 5 by, for example, fastening the holder 45 at the front case 29 or fixing it to the inner side surface of the front case 29 by a two-sided tape 47.

The speech use speaker 33 is fit in a speaker use recess part 29b formed in the inner side surface of the front case 29 so that the sound emitting surface 33a faces the inner side surface of the front case 29 (to the lower side of the paper surface in FIG. 2) and a terminal part 33b faces the rear case 37 side.

The circuit board 35 is comprised of, for example, a printed circuit board using a hard resin as a base. The circuit board 35 is formed relatively wide, for example, has a broadness covering a plurality of hole parts 41. In the circuit board 35, an opening part 35h for fitting the sub display device 31 and the holder 45 is formed.

On the circuit board 35, a variety of electronic parts are arranged whereby an electronic circuit is constituted. A control circuit for controlling operations of the main display device 27 and the sub display device 31 is comprised by a variety of electronic parts. On a mount surface of the circuit board 35, a ground pattern layer 35c forming a ground line of the circuit board 35 (electronic circuit) is arranged in a predetermined pattern. The end of the circuit board 35 on the speaker 33 side is provided with a terminal 49 connected to the terminal part 33b of the speaker 33.

On the two sides of the connecting recess part 5e of the second housing 5 in the rotation axis RA direction, a first hinge part 51 and a second hinge part 53 constituting the connecting part 7 are provided. The first hinge part 51 and the second hinge part 53 are parts inserted through the first housing 3 and second housing 5 and pivotally supporting the first housing 3 and second housing 5 about the rotation axis RA.

The first hinge part 51 has a first member 51a fixed to the first housing 3 and a second member 51b fixed to the second housing 5. The first member 51a and the second member 51b can relatively rotate around the rotation axis RA. Inside the first hinge part 51, a click mechanism causing a click feeling when opening or closing the mobile phone 1 is provided.

The second hinge part 53 has a third member 53a arranged in the first housing 3 and a fourth member 53b arranged in the second housing 5. The third member 53a is formed by a resin having a lubricating property. The third member 53a is formed in a cylindrical shape, is fit in a not shown hole part formed in the surface of the connecting projection 3e perpendicular to the rotation axis RA, and can slide with respect to an edge forming the hole part.

The fourth member 53b is formed by, for example, a metal and is fixed to the second housing 5. The method of fixing the fourth member 53b to the second housing 5 is, for example, as follows. The fourth member 53b extends from the rotation axis RA up to an arrangement position of the hole part 41A. A hole part 53c is formed in the fourth member 53b at the position superimposed over the hole part 41A. A screw 39 inserted through the hole part 41A is inserted through the hole part 53c as well and screwed into the screw boss 43A. Due to this, the fourth member 53b is fixed to the second housing 5.

Note that, the second hinge part 53 is also utilized for positioning a not shown signal line connecting the circuit board 35 and a not shown circuit board in the first housing 3. The fourth member 53b is formed in a recessed shape so that the rear case 37 side is recessed. A not shown signal line is positioned by the recess of the fourth member 53b and is inserted inside the third member 53a for positioning.

Figure 3:
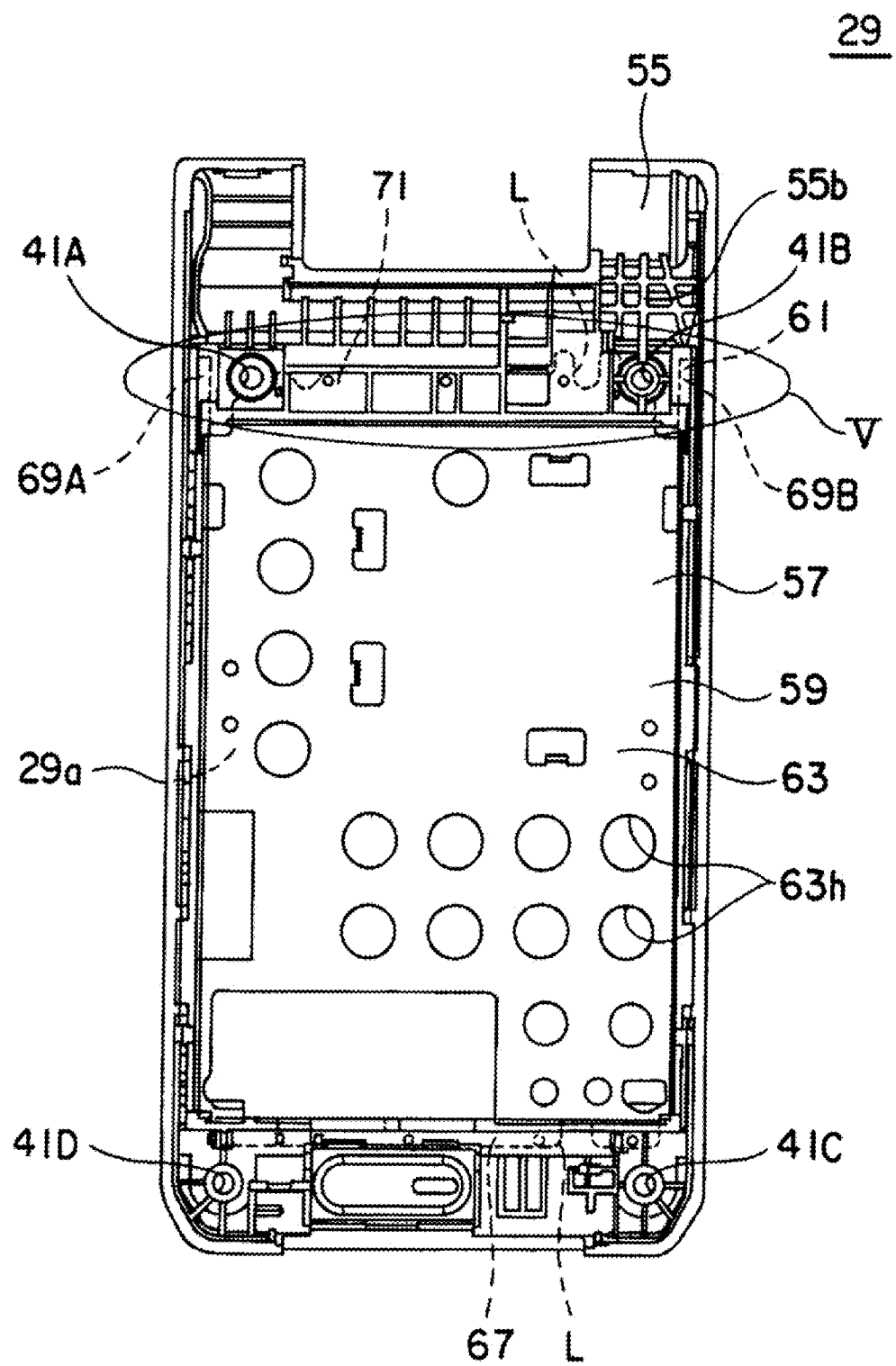
[FIG. 3] A plan view of a front case of the second housing of FIG. 2.

FIG. 3 is a plan view of the front case 29 seen from the inside of the housing.

The front case 29 has a resin part 55 formed by a resin and a sheet metal part 57 formed by a metal. The sheet metal part 57 is embedded in the resin part 55 at its outer periphery part as indicated by a dotted line L.

Figure 4:
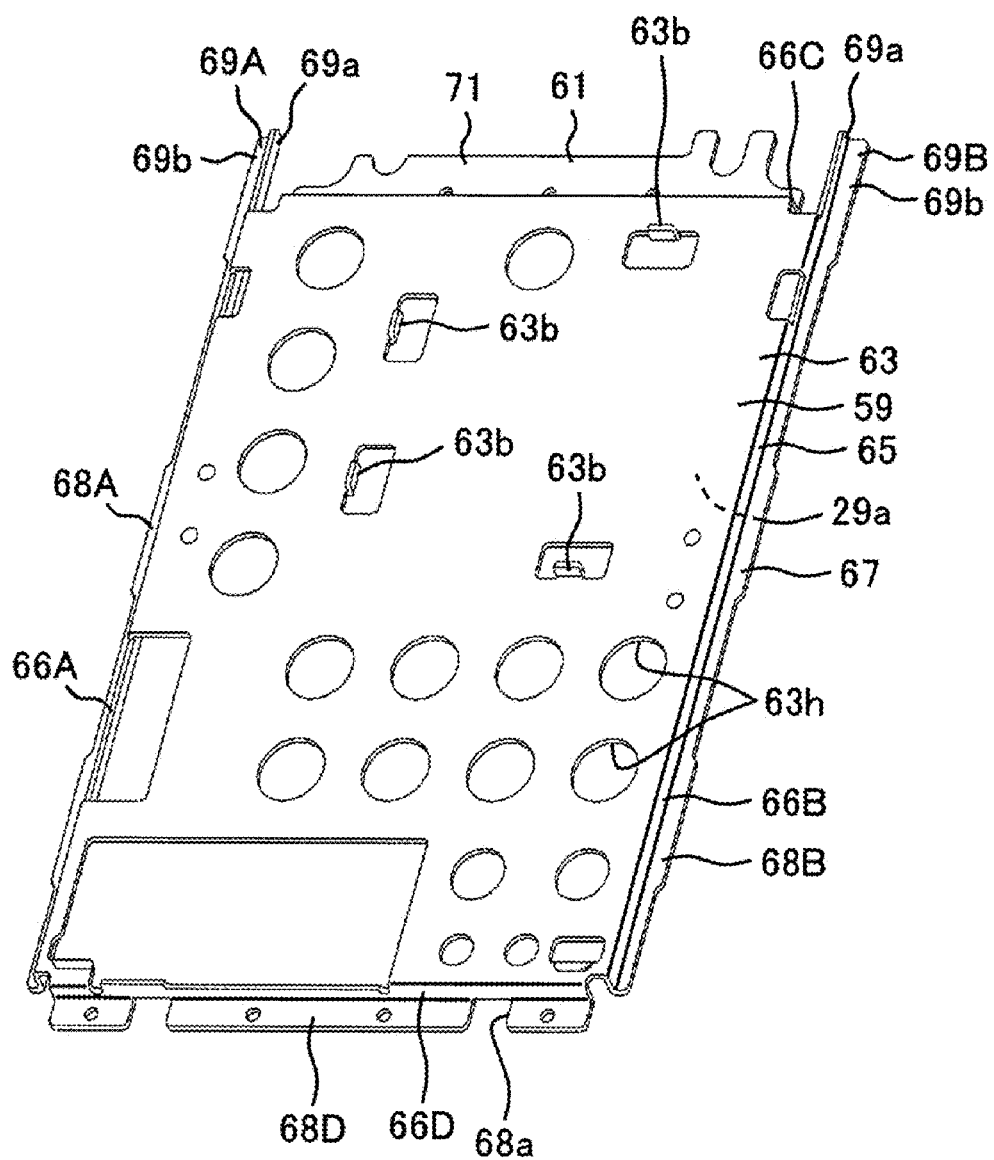
[FIG. 4] A perspective view of a sheet metal part of the front case of FIG. 3.

FIG. 4 is a perspective view of the sheet metal part 57.

The sheet metal part 57 has a main body part 59 surrounded by a plurality of hole parts 41 and an extension part 61 extending from the main body part 59 to the connecting part 7 side.

The main body part 59 has a base part 63 facing the rear case 37, a wall part 65 at the edge of the base part 63 standing up from the base part 63, and a flange 67 projecting out from the ridge of the wall part 65 to the outer periphery side of the sheet metal part 57. Note that, the base part 63 and the wall part 65 form a holding recess part 29a in which the main display device 27 is contained.

The base part 63 is formed as a flat plate having equivalent size and shape as the main display device 27. The base part 63 is formed to for example a rectangle. The base part 63 has a plurality of opening parts 63h formed by punching for lightening the weight. Further, the base part 63 has cutaway parts and/or hole parts for securing regions for placement of electronic parts. In the base part 63, projections 63b are formed for positioning the holder 45.

The wall part 65 projects out from the base part 63 to the facing surface part 5a side. The wall part 65 is, for example, perpendicular to the base part 63. However, the wall part 65 may also be inclined with respect to the direction perpendicular to the base part 63. The wall part 65 surrounds substantially the entire periphery of the base part 63. Namely, the wall part 65 has a first wall part 66A and a second wall part 66B which extend in the direction perpendicular to the rotation axis RA and a third wall part 66C and a fourth wall part 66D which extend in a direction parallel to the rotation axis RA.

The flange 67 is arranged parallel to the base part 63. However, the flange 67 may also be inclined with respect to the base part 63. The flange 67 has a first flange 68A, second flange 68B, and fourth flange 68D respectively projecting from the first wall part 66A, second wall part 66B, and fourth wall part 66D to the outer periphery side of the sheet metal part 57. At the edge of the flange 67, for the purpose of preventing unintended detachment of the sheet metal part 57 from the resin part 55, unevenness is formed. Two cutaway parts 68a reaching the fourth wall part 66D are formed in the fourth flange 68D.

The extension part 61 has a first side part 69A and second side part 69B (below, sometimes simply referred to as "side parts 69" and not differentiated) located at the two sides in the rotation axis RA direction and a center part 71.

The first side part 69A is formed so that the first wall part 66A and the first flange 68A extend to the connecting part 7 side. In the same way, the second side part 69B is formed so that the second wall part 66B and the second flange 68B extend to the connecting part 7 side. Specifically, this is as follows.

The side parts 69 have wall continuation parts 69a which are formed in plate shapes extending from the main body part 59 side to the connecting part 7 side and bulging outward in the facing direction of the front case 29 and the rear case 37. The wall continuation parts 69a are formed, specifically, in plate shapes perpendicular to the rotation axis RA and the base part 63. Note that, the wall continuation parts 69a also may be inclined with respect to the rotation axis RA and the base part 63. The wall continuation part 69a of the first side part 69A connects to the first wall part 66A so that the wall continuation part 69a of the first side part 69A and the first wall part 66A form a single plane. In the same way, the wall continuation part 69a of the second side part 69B connects to the second wall part 66B so that the wall continuation part 69a of the second side part 69B and the second wall part 66B form a single plane.

Further, the side parts 69 have flange continuation parts 69b which are formed in plate shapes extending from the main body part 59 side to the connecting part 7 side and bulging outward in the rotation axis RA direction. The flange continuation parts 69b are, more specifically, formed in plate shapes parallel to the base part 63 (rotation axis RA). Note that, the flange continuation parts 69b also may be inclined with respect to the base part 63. The flange continuation part 69b of the first side part 69A connects to the first flange 68A so that the flange continuation part 69b of the first side part 69A and the first flange 68A form a single plane. In the same way, the flange continuation part 69b of the second side part 69B connects to the second flange 68B so that the flange continuation part 69b of the second side part 69B and the second flange 68B form a single plane.

The center part 71 projects out from the ridge of the third wall part 66C to the connecting part 7 side. The center part 71 is arranged parallel to the base part 63. However, the center part 71 may also be inclined with respect to the base part 63. At the edge of the center part 71, for the purpose of preventing unintended detachment of the sheet metal part 57 from the resin part 55, unevenness is formed.

As shown in FIG. 3, the sheet metal part 57 is embedded in the resin part 55 at the flange 67 of the main body part 59 and the extension part 61. Namely, the flange 67 of the main body part 59 and the extension part 61 are covered at both their facing surface part 5a side and the back surface part 5b side surfaces by the resin part 55. The base part 63 and wall part 65 of the main body part 59 are not embedded in the resin part 55. Specifically, the base part 63 is not covered at both its facing surface part 5a side and back surface part 5b side surfaces by the resin part 55, but is exposed from the resin part 55. The wall part 65 is covered at its outer periphery side (side of flange 67 and extension part 61) surface by the resin part 55, but is not covered at its inner periphery side (side of base part 63) surface by the resin part 55, but is exposed from the resin part 55. Note that, the holding recess part 29a receiving the main display device 27 is constituted by the base part 63 and wall part 65 of the main body part 59 of the sheet metal part 57.

The length in the width direction of the main body part 59 of the sheet metal part 57 is substantially equal to the length in the width direction of the resin part 55. The length in the length direction of the main body part 59 of the sheet metal part 57 is smaller than the length in the length direction of the resin part 55. The length in the length direction of the sheet metal part 57 is at least half of the length of the resin part 55.

The main body part 59 of the sheet metal part 57 is surrounded by a plurality of hole parts 41. Specifically, in the length direction, it is between hole parts 41 and 41B and hole parts 41C and 41D. The hole parts 41A and 41B are located closer to the connecting part 7 side than the main body part 59. In the part of the resin part 55 on the connecting part 7 side further than the hole parts 41A and 41B, a plurality of ribs 55b are formed for the purpose of increasing the housing strength etc. The plurality of ribs 55b, for example, include ribs extending in the length direction, so a flexural rigidity in the length direction becomes greater. Further, the plurality of ribs 55b, for example, include ribs extending in the width direction, so a flexural rigidity in the width direction becomes greater.

Figure 5:
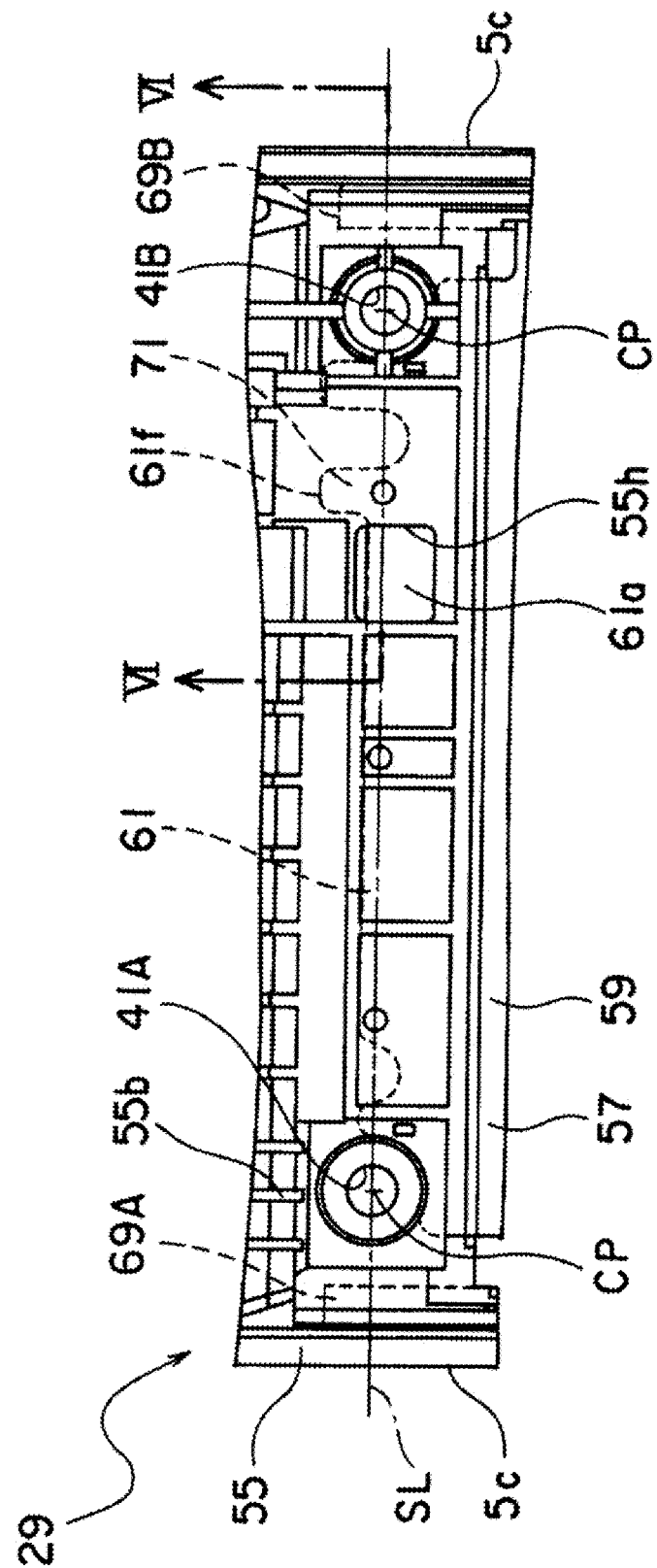
[FIG. 5] An enlarged view of a region V of FIG. 3.

FIG. 5 is an enlarged view of a region V in FIG. 3.

The extension part 61 extends to the connecting part 7 side further than the hole parts 41A and 41B located closer to the connecting part 7 side than the main body part 59. Specifically, an edge 61f of the extension part 61 on the connecting part 7 side is located at the connecting part 7 side further than the centers CP of the hole parts 41A and 41B in the length direction. Further, from another viewpoint, the edge 61f is located at the connecting part 7 side further than a standard line SL connecting the centers CP of the hole parts 41A and 41B. Note that, in the present embodiment, the standard line SL is perpendicular to the length direction.

In the extension part 61, both of the side parts 69 and the center part 71 extend to the connecting part 7 side further than the hole parts 41A and 41B. Note that, it is also possible that only one of the side parts 69 and the center part 71 extend up to the connecting part 7 side further than the hole parts 41A and 41B.

The hole parts 41A and 41B are arranged at the outer periphery (outer peripheral surface part 5c) side of the front case 29 in the direction (width direction) perpendicular to the direction (length direction) from the main body part 59 to the connecting part 7. Namely, the positions of the hole parts 41A and 41B are closer to the outer peripheral surface part 5c than the center of the front case 29 in the width direction.

The first side part 69A and the second side part 69B are arranged at the outer periphery side of the front case 29 relative to the hole parts 41A and 41B in the width direction. Namely, the first side part 69A and the second side part 69B are closer to the outer peripheral surface part 5c than the hole parts 41A and 41B. From another viewpoint, the first side part 69A and the second side part 69B are arranged at the outside of the two hole parts 41A and 41B arranged at different positions in the width direction.

In the center part 71, the part located at the connecting part 7 side further than the hole parts 41A and 41B is arranged at the center side of the front case 29 relative to the hole parts 41A and 41B in the width direction. From another viewpoint, in the center part 71, the part located at the connecting part 7 side further than the hole parts 41A and 41B is arranged between the two hole parts 41A and 41B arranged at different positions in the width direction.

Note that, in the front case 29, the parts forming the hole parts 41A and 41B are formed by the resin part 55. However, the hole parts 41A and 41B may be formed by both the resin part 55 and the sheet metal part 57 or may be formed by only the sheet metal part 57.

In the resin part 55, an opening part 55h is formed for exposing a part (exposed part 61a) of the extension part 61. Specifically, the opening part 55h is formed in a part of the resin part 55 covering the center part 71. The center part 71 forms the exposed part 61a. The exposed part 61a includes an edge located at the connecting part 7 side of the center part 71 further than the hole parts 41A and 41B. The shape and size of the exposed part 61a are appropriately set.

As explained with reference to FIG. 2, the second hinge part 53 extends up to the arrangement position of the hole part 41A. Specifically, the edge of the fourth member 53b of the second hinge part 53 on the main body part 59 side is located at the main body part 59 side further than the hole part 41A. Accordingly, the fourth member 53b of the second hinge part 53 extends to the main body part 59 side further than the front end of the extension part 61 of the sheet metal part 57. Namely, the fourth member 53b and the extension part 61 overlap each other in positions in a longitudinal direction.

Figure 6:
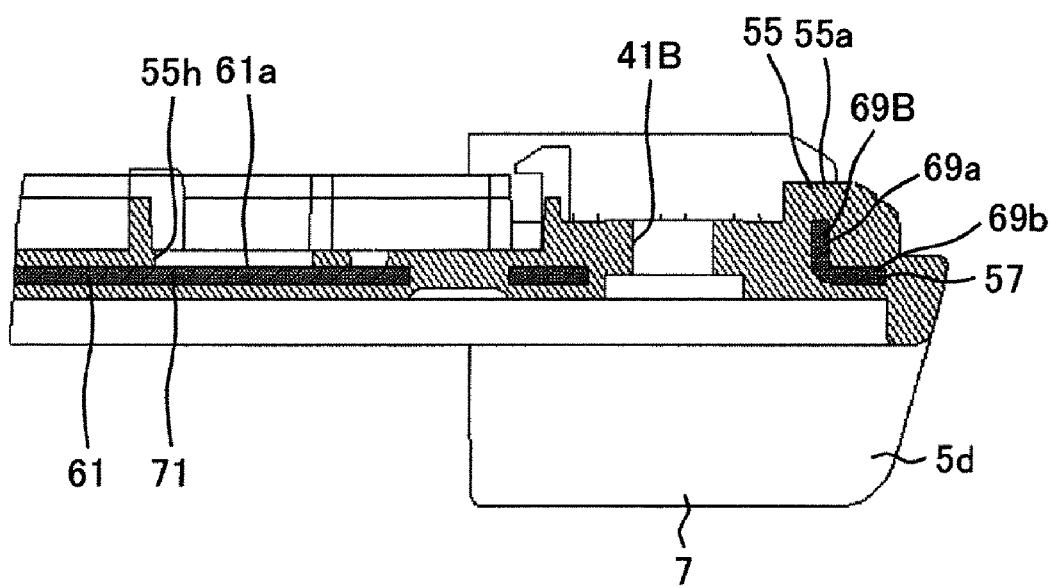
[FIG. 6] A cross-sectional view taken along a line VI-VI in FIG. 5.

FIG. 6 is a cross-sectional view taken along a VI-VI arrow direction in FIG. 5.

The resin part 55 has a thick part 55a which covers the second side part 69B and is thicker than the part covering the center part 71. Specifically, the thick part 55a is formed thick enough to project to the back surface part 5b side (upward from the paper surface in FIG. 6, the projection direction side of the wall continuation part 69a with respect to the flange continuation part 69b and the flange 67). The resin part 55, due to the thick part 55a, is secured a thickness sufficient for covering the back surface part 5b side of the wall continuation part 69a. As shown in FIG. 2, the thick part 55a extends along the second side part 69B. Namely, it extends from the main body part 59 side of the sheet metal part 57 to the connecting part 7 side. The part of the resin part 55 forming the edge of the hole part 41B is formed slightly thick, but is formed thinner than the thick part 55a.

In the same way, the resin part 55 has a thick portion 55a which covers the first side part 69A on the hole part 41A side. The thick part 55a covering the first side part 69A functions as the positioning part for positioning the second hinge part 53. For example, in the resin part 55, the thick part 55a covering the first side part 69A, a rib 55c facing the thick part 55a in the width direction, and a part covering the connecting part 7 side of the third wall part 66c form a rectangular recess in which the fourth member 53b of the second hinge part 53 can be fit. The thick part 55a covering the first side part 69A abuts against the outer periphery side of the fourth member 53b to position the fourth member 53b.

As shown in FIG. 2, by formation of the opening part 55h in the resin part 55, the exposed part 61a provided in the extension part 61 of the sheet metal part 57 is exposed to the rear case 37 side. In other words, it is exposed to the inside of the housing. However, as shown in FIG. 6, the exposed part 61a is covered by the resin part 55 at the opposite side from the rear case 37.

Figure 7:
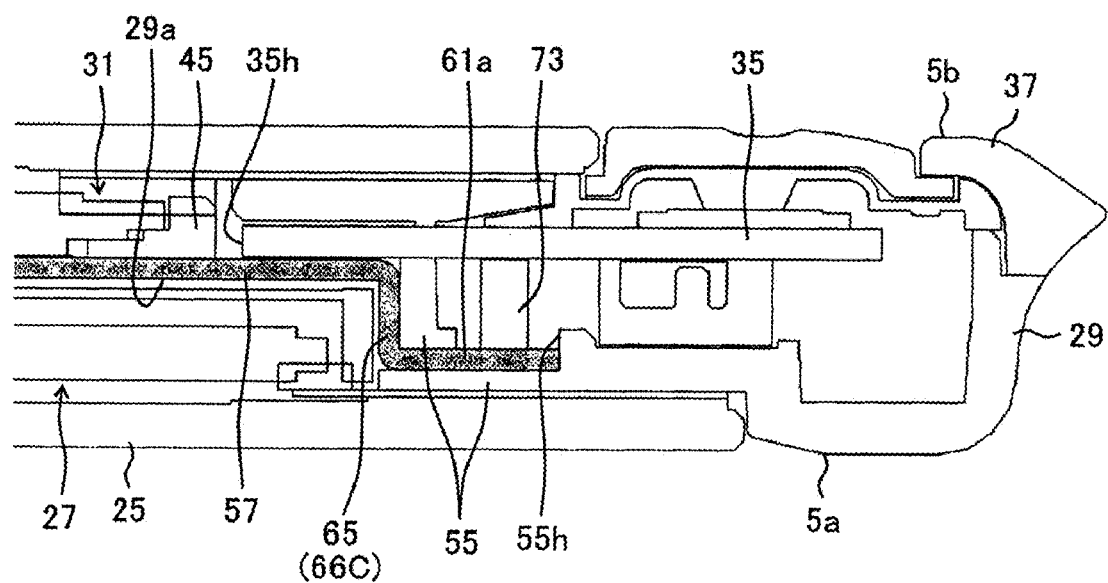
[FIG. 7] A cross-sectional view taken along a line VII-VII in FIG. 1(a).

FIG. 7 is a cross-sectional view of the second housing 5 taken along a VII-VII arrow direction in FIG. 1(a). Note that, the lower side of the paper surface in FIG. 7 is the facing surface part 5a side.

As explained above, in the second housing 5, the panel 25, main display device 27, front case 29, sub display device 31 and circuit board 35, and rear case 37 are stacked. Further, the main display device 27 is held in the holding recess part 29a constituted by the sheet metal part 57. The sub display device 31 is stacked on the base part 63 of the main body part 59 of the sheet metal part 57 through the holder 45. The part of the resin part 55 which covers the outer periphery of the wall part 65 of the main body part 59 of the sheet metal part 57 projects slightly further to the rear case 37 side than the base part 63. The circuit board 35 is supported by the resin part 55. Note that, a spacer may be provided between the circuit board 35 and the base part 63 as well.

The sheet metal part 57 is electrically connected to the ground line of the circuit board 35. Specifically, this is done as follows. The circuit board 35 faces the exposed part 61a of the sheet metal part 57. A conductive member 73 is arranged between the circuit board 35 and the exposed part 61a. The conductive member 73 abuts against the exposed part 61a and abuts against a ground pattern layer 35c provided on the mount surface of the circuit board 35 facing the exposed part 61a. The conductive member 73 is constituted by, for example, a spring terminal provided on the circuit board 35 and abuts against the exposed part 61a when the second housing 5 is assembled.

In the front case 29 as described above, the sheet metal part 57 is integrally formed by so-called insert molding. Specifically, first, the sheet metal part 57 is formed. The sheet metal part 57 is formed by punching, bending, drawing, and otherwise press working a single sheet of metal. Next, the sheet metal part 57 is arranged in the cavity of a pair of molds of an injection molding machine and is clamped by the pair of molds. The base part 63 in the main body part 59 of the sheet metal part 57 is clamped by the pair of molds using the facing direction of the front case 29 and the rear case 37 as the clamping direction. Then, molten resin for forming the resin part 55 is injected and filled into the cavity whereby the front case 29 is formed. In the sheet metal part 57, the part clamped by the pair of molds becomes the part exposed from the resin part 55 at both of the facing surface part 5a side and the back surface part 5b side. The exposed part 61a is formed by abutment of only one mold among the pair of molds against the sheet metal part 57.

Figure 8:
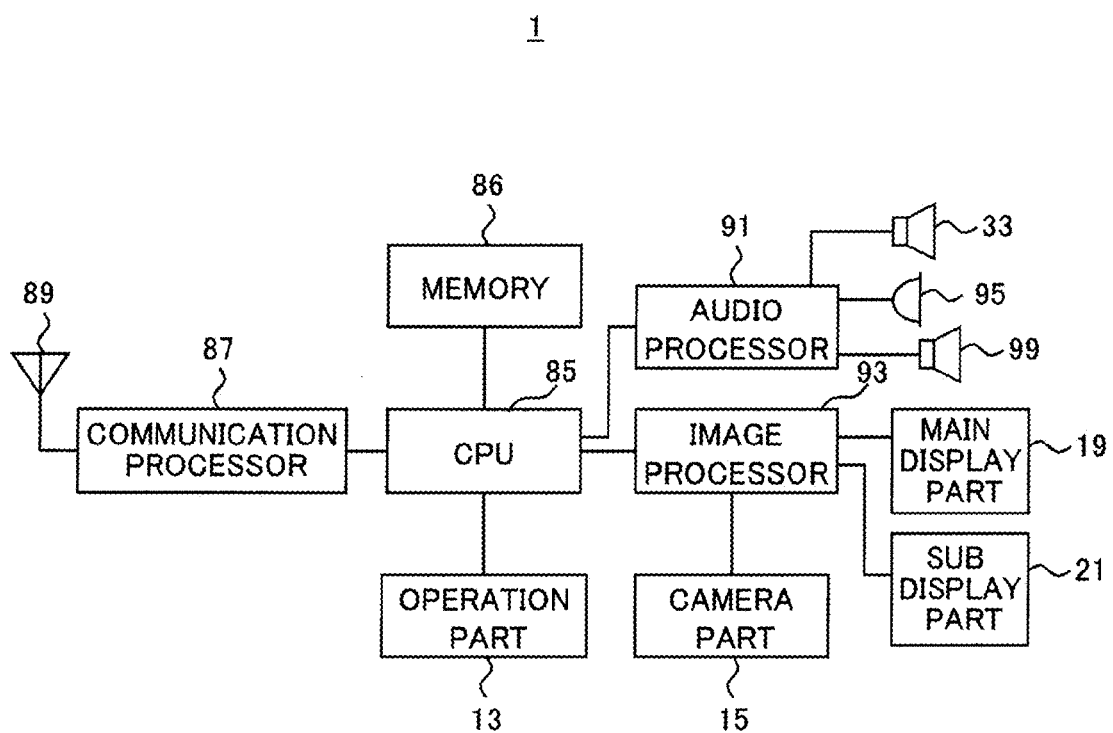
[FIG. 8] A block diagram showing the configuration of a signal processing system of the mobile phone of FIG. 1.

FIG. 8 is a block diagram showing the configuration of a signal processing system of the mobile phone 1.

The mobile phone 1 is provided with a CPU 85, memory 86, communication processor 87, audio processor 91, and image processor 93. These parts are for example constituted by IC's provided in a not shown circuit board in the first housing 3 and the circuit board 35 etc. in the second housing 5.

The CPU 85 and memory 86 perform predetermined processing based on signals from various means such as the operation part 13 and function as the control part executing control of the image processor 93 and other various means.

The communication processor 87 includes a high frequency circuit. The communication processor 87 modulates audio data, image data, and other various types of data processed at the CPU 85 and transmits the result through an antenna 89 for long distance wireless communication utilizing signals. Further, the communication processor 87 demodulates signals received through the antenna 89 and outputs the result to the CPU 85.

The audio processor 91 converts the audio data from the CPU 85 to electric signals and outputs the results to the speech use speaker 33 and speaker 99 for the ring tones etc. The speaker 33 and speaker 99 convert electric signals from the audio processor 91 to sound and output the results. On the other hand, the microphone 95 converts input sound to electric signals and outputs the results to the audio processor 91. The audio processor 91 converts electric signals from the microphone 95 to audio data and outputs the result to the CPU 85.

The image processor 93 converts image data from the CPU 85 to image signals and outputs the results to the main display part 19 and the sub display part 21. Further, it converts capture signals (image data) output from the camera part 15 to image data with a predetermined format and outputs the results to the CPU 85.

According to the above embodiment, the sheet metal part 57 has an extension part 61 which extends from the main body part 59 up to the connecting part 7 side (up to the position near the connecting part 7) further than the hole parts 41A and 41B (connected portions) located closer to the connecting part 7 side than the main body part 59 (near the connecting part 7) and is embedded in the resin part 55. Accordingly, in the front case 29, a part between the hole parts 41A and 41B on the connecting part 7 side and the main body part 59 which suffered from stress concentration due to the main body part 59 of the sheet metal part 57 and was not reinforced by the ribs etc. of the resin part 55 so much is reinforced in strength by the extension part 61. Further, breakage of a housing due to stress concentration occurring between the main body part 59 of the sheet metal part 57 and the hole parts 41A and 41B (connected portions) is suppressed. In addition, the extension part 61 is formed by extending a part of the sheet metal part 57, therefore the number of parts does not increase.

The extension part 61 has the wall continuation part 69a extending from the main body part 59 up to the connecting part 7 side further than the hole parts 41A and 41B located closer to the connecting part 7 side than the main body part 59 and bulging outward in the facing direction of the front case 29 and the rear case 37. That is, the extension part 61 has the wall continuation part 69a arranged along the direction in which the front case 29 and the rear case 37 face each other. Accordingly, a moment of inertia of cross-sectional area of the extension part 61 with respect to bending in an opening direction of the mobile phone 1 is made relatively large with respect to the cross-sectional area of the extension part 61, and the rigidity can be increased while reducing the size. In addition, the wall continuation part 69a can be easily formed by bending or the like.

The main body part 59 has the base part 63 facing the rear case 37 and the first wall part 66A and second wall part 66B provided standing up from the base part at the edge extending to the connecting part 7 side of the base part 63 (the first wall part 66A and second wall part 66B arranged along the direction in which the front case 29 and the rear case 37 face each other) so that the holding recess part 29a receiving the main display device 27 is formed. Further, the wall continuation part 69a is formed continuing with the first wall part 66A and the second wall part 66B so as to form a single plane together with the first wall part 66A and the second wall part 66B, therefore the flexural rigidity between the main body part 59 and the extension part 61 becomes strong.

FIG. 9 is a diagram explaining the effects described above. In the perspective view of FIG. 9(a), a side part 169 of the extension part extending from the main body part 59 to the connecting part 7 side is provided at a position away from the first wall part 66A. Further, the wall part 169a of the side part 169 does not continue with the first wall part 66A of the main body part 59.

In this case, as shown in FIG. 9(b), which is a cross-sectional view taken along the IXb-IXb arrow direction in FIG. 9(a), when a bending moment as indicated by an arrow y1 is applied, bending deformation occurs at an interface part of the side part 169 and main body part 59 as shown in FIG. 9(c) since the moment of inertia of cross-sectional area at the interface part between the side part 169 and the main body part 59 is small.

However, when the wall continuation part 69a of the first side part 69A and the first wall part 66A of the main body part 59 continue with each other as in the present embodiment, as shown in FIG. 9(d), even at the interface part between the first side part 69A and the main body part 59, the moment of inertia of cross-sectional area is high, so bending deformation is suppressed. Note that, the aspect shown in FIG. 9(a) is an embodiment of the present invention as well.

The hole parts 41A and 41B located closer to the connecting part 7 side than the main body part 59 are arranged at the outer periphery side of the front case 29 in the direction (width direction) perpendicular to the direction from the main body part 59 to the connecting part 7, and the wall continuation part 69a is arranged at the outer periphery side of the front case 29 relative to the hole parts 41A and 41B in the width direction. Accordingly, the first wall part 66A and second wall part 66B and the wall continuation part 69a can be made continuous while making the holding recess part 29a constituted by the first wall part 66A and second wall part 66B of the main body part 59 etc. large.

In the resin part 55, the opening part 55h exposing the extension part 61 is formed. Therefore, in comparison with a case where the only main body part 59 is clamped by the molds, the degree of flatness of the sheet metal part 57 can be effectively secured. For example, in insert molding, when resin is injected into the cavity, a load is applied to the sheet metal part 57, so warping is liable to occur. In particular, when warping occurs in the sheet metal part 57, the displacement becomes larger the closer to the outer periphery side. However, conventionally, the outer peripheral side part (flange 67) was a part which had to be embedded, and its area was small for making the holding recess part 29a etc. large, therefore its displacement was not restricted by the molds. In the present embodiment, by pressing the part that becomes the exposed part 61a in the extension part 61 by the molds, occurrence of warpage of the sheet metal part 57 is effectively suppressed.

The mobile phone 1 has the conductive member 73 which abuts against the exposed part 61a exposed from the opening part 55h in the extension part 61 and connects the extension part 61 and the ground line of the circuit board 35, therefore the exposed part 61a is not only useful for suppressing occurrence of warping, but is also utilized for connecting the ground line.

The second hinge part 53 extends to the main body part 59 side further than the front end of the extension part 61 on the connecting part 7 side. That is, the second hinge part 53 is arranged up to a position closer to the main body part 59 than the front end. Accordingly, the second housing 5 is reinforced by at least one of the extension part 61 and the second hinge part 53 in its portion from the main body part 59 to the connecting part 7. Accordingly, breakage of the second housing 5 is further suppressed.

Note that, in the above embodiment, the mobile phone 1 is an example of the portable electronic device of the present invention, the front case 29 is an example of the first case member, the rear case 37 is an example of the second case member, the plurality of hole parts 41 are one example of the plurality of connected portions, a resin is an example of the first material, a metal is an example of the second material, the resin part 55 is an example of the first component part, the sheet metal part 57 is an example of the second component part, the wall continuation part 69a is an example of the reinforcing part, and the main display device 27 is an example of the electronic parts.

The present invention is not limited to the above embodiment, however, and may be carried out in various ways.

The portable electronic device is not limited to a mobile phone. For example, it may be PDA, laptop computer, digital camera, or game machine as well. Further, the housing including the first housing and second housing which are connected to be able to open and close is not limited to a flip-open type one, but may be a slide type one or a revolver type one as well.

The connected portion of the first case member is not limited to a hole part in which a screw is inserted. For example, the connected portion may be a screw boss with which a screw is screwed as well or may be an engagement part or engaged part as well.

The shapes and sizes of the main body part and extension part can be appropriately set. For example, in the embodiment, the case where the side part 69 of the extension part 61 has the wall continuation part 69a and flange continuation part 69b was exemplified, but it may have only the wall continuation part 69a as well.

The invention claimed is:

1. A portable electronic device comprising:
a first housing,
a second housing, and
a connecting part connecting the first housing and the second housing to be able to open and close, wherein
the second housing has a first case member and a second case member which are arranged to face each other in a direction in which the second housing faces the first housing in a closed state,
the first case member has a plurality of connected portions which are arranged at a plurality of positions facing the second case member and connected with the second case member, a first component part formed by a first material, and a second component part formed by a second material having a higher modulus of elasticity than the first material and at least partially embedded in the first component part, and
the second component part has a main body part surrounded by the plurality of connected portions, and an extension part extending from the main body part up to a position closer to the connecting part than a connected portion arranged closer to the connecting part than the main body part among the plurality of connected portions and embedded in the first component part.

2. A portable electronic device as set forth in claim 1, wherein the extension part has a reinforcing part arranged along a direction in which the first case member and the second case member face each other.

3. A portable electronic device as set forth in claim 2, wherein
the main body part has a holding recess part formed to be able to hold an electronic part,
the holding recess part has a wall part arranged along the direction in which the first case member and the second case member face each other, and
the reinforcing part is formed continuous from the wall part.

4. A portable electronic device as set forth in claim 1, wherein
the connected portion located closer to the connecting part than the main body part is arranged at the outer periphery side of the first case member in a direction perpendicular to a direction from the main body part to the connecting part, and
the reinforcing part is arranged at the side of the outer periphery of the first case member relative to the connected portion located closer to the connecting part than the main body part in the perpendicular direction.

5. A portable electronic device as set forth in claim 1, wherein
the first material is a resin, and
the second material is a metal.

6. A portable electronic device as set forth in claim 5, wherein the first component part is formed with an opening part exposing the extension part.

7. A portable electronic device as set forth in claim 6, further comprising:
a circuit board provided in the second housing and
a conductive member which abuts against a portion of the extension part exposed from the opening part to connect the extension part and a ground line of the circuit board.

8. A portable electronic device as set forth in claim 1, wherein
the connecting part has hinge parts inserted through the first housing and the second housing, and
the hinge parts are arranged up to a position closer to the main body part than the front end of the extension part on the connecting part side.

* * * * *